Patented Mar. 27, 1951

2,546,238

UNITED STATES PATENT OFFICE 2,546,238

INHIBITION OF ACRYLONITRILE POLYMERIZATION

John Cadwallader Richards, Champaign, Ill., assignor to E. I. du Pont de Nemours & Company, Wilmington, Del., a corporation of Delaware No Drawing. Application February 18, 1947,
Serial No. 729,395

7 Claims. (Cl. 260—88.7)

This invention relates to the obtaining of improved polyacrylonitrile and more particularly to the obtaining of uniform molecular weight polymer and to the recovery of unreacted monomer from the polymerization processes.

The greatest problem in commercial polymerization processes, whether batch or continuous, is the production of a uniform and reproducible polymer. It is especially difficult to control the molecular weight of polymeric materials due to continued polymerization at high yields with the formation of polymer of molecular weight differing from and lower than the average molecular weight of polymers formed at low yields. For example, in the solution polymerization of vinyl compounds whose polymeric form is insoluble in the polymerization medium, polymerization continues in the slurry until unchanged monomer is removed from the polymer by filtration, for example. Even after filtration any unreacted monomer in the filtrate will continue to polymerize, thus reducing considerably the amount that is recoverable for recirculation. Frequently in commercial operation the necessary filter capacity is not available at the exact moment that a particular batch of polymer reaches the desired average molecular weight and it is necessary to discard large amounts of polymerized material because the polymerization reaction has proceeded too far and is not acceptable due to its off-standard molecular weight and, consequently, different properties.

Processes on the inhibition or stabilization against polymerization of monomeric polymerizable compounds are well known. The stabilizers or inhibitors employed, however, must be removed prior to polymerization either by distillation or extraction. This invention is not concerned with such inhibition or stabilization but deals with the use of polymerization "stoppers" to control the molecular weights of the polymers. The inhibitors and stabilizers of the prior art cannot advantageously be used to stop polymerization processes because they must be removed, as pointed out above, before the unchanged monomer can be recycled. The investment in equipment and time for removal by distillation or extraction of the polymer adds substantially to the cost of articles made from the polymeric materials. There are several reasons for desiring to stop a polymerization reaction. The most important of these is that a polymer of heterogeneous molecular weight very often has physical and chemical properties that vary from batch to batch and, accordingly, is inferior for the uses to which normal or homogeneous polymers are usually put. Therefore, it is desirable to stop the polymerization reactions before reaching the point where yields are high in order to prevent the formation of polymer of molecular weight deviating widely from the average and to prevent unreacted monomer from polymerizing before and during recovery operations.

This invention has as an object the provision of a means for stopping the polymerizations of acrylonitrile when the desired polymer yields have been reached. Another object is the provision of processes for the stoppage of acrylonitrile polymerizations which do not necessitate the removal of the controlling agents used prior to subsequent polymerization in the particular systems. A further object is the provision of inhibiting materials that are easily removable from the polymerizates and filtrates without the use of expensive intermediate processes. A still further object is the provision of stoppers and processes that do not result in the hydrolysis or other harmful modification of the monomeric compounds. Other objects will appear hereinafter.

These objects are accomplished by adjusting the pH of acrylonitrile polymerization reaction mixtures to moderate alkalinity. The desired pH is achieved by the addition of a moderately alkaline material so that the solution of monomer or monomers, polymer and catalyst is buffered on the alkaline side, thereby stopping the polymerization reaction.

The following examples, wherein parts are by weight, are given by way of illustration and are not to be considered as limitative. The method of stopping polymerization is discussed below in relation to the activated-persulfate catalyzed polymerization of acrylonitrile. The polymerization procedure employed is as follows:

Sixteen parts of acrylonitrile is dissolved in 300 parts of distilled water in a closed vessel equipped with a slow speed stirrer. The solution is purged with nitrogen to remove entrapped air and a blanket of nitrogen is maintained above the reaction mixture. Then 0.1 part of ammonium persulfate (catalyst) and 0.2 part of sodium bisulfite (activator) are added to this solution. An amount of polymerization stopper as shown in the table below is then added immediately. The reactants are maintained at 40° C. by means of a water bath. At the end of two hours the solutions are filtered and the solid polymer is dried and weighed to determine the yield. For purposes of comparison a control example is included. The control is prepared exactly as above except that the polymerization stopper is omitted.

| Example | Control | | pH | Polymer Yield Per Cent | Remarks |
|---|---|---|---|---|---|
| | Stopper | Parts | | | |
| 1 (Control) | | | 4.15 | 75 | Rapid Polymerization. |
| 2 | sodium borate | 0.3 | 8.6 | 0 | No Polymerization. |
| 3 | sodium bicarbonate | 0.3 | 7.2 | 0 | Do. |
| 4 | sodium hydroxide | 0.09 | 7.0 | 0 | Do. |

By a comparison of the above results, it can be seen that the adjusting of pH to the critical range prevents polymerization.

The following examples further demonstrate the use of this invention in stopping a polymerization reaction. This is to control the molecular weight of the polymer formed and to prevent polymerization of unreacted monomer. The procedure employed is as follows:

Solutions are prepared as described for the preceding examples with the exception that no stopper is added. The polymerization reaction is allowed to proceed for one-half hour. At this point the yield of polymer is about 30%. The reaction mixture is filtered rapidly to remove the precipitated polymer and the filtrate is held in a closed vessel blanketed with nitrogen to avoid loss of monomer and contamination with air. Immediately after filtration, an amount of polymerization stopper as given in the following table is added to the filtrate. At the end of 1.5 hours the filtrate is again filtered and any solid polymer formed is dried and weighed to determine how much monomer has polymerized. Example #5 is given for purposes of comparison. This is identical with the subsequent experiments except that the addition of stopper is omitted.

| Example | Control | | pH of Filtrate | Polymer Yield, Per Cent |
|---|---|---|---|---|
| | Stopper | Parts | | |
| 5 (Control) | | | 4.2 | 45 |
| 6 | sodium bicarbonate | 0.3 | 7.2 | 0 |
| 7 | sodium borate | 0.3 | 8.6 | 0 |
| 8 | sodium hydroxide | 0.02 | 7.4 | 0 |

In Control Example #5 at the end of 1.5 hours 45% of the monomer present after filtration had been polymerized while in Examples 6, 7 and 8, in each of which the process of this invention was employed, no polymer was formed in the filtrate, complete stoppage of the polymerization being effected. The process of this invention, accordingly, provides a desirable feature if the monomer is to be recovered. The monomer may be recovered almost quantitatively by passing the filtrate through a stripping still of the proper design, or if desired, the pH of the system may be adjusted by the addition of acidic materials to permit further polymerization to occur.

The amounts of the stoppers employed may be such that the pH values of the resultant systems vary from 6.0 to 10.0. While effective control of the polymerization is obtained within this pH range, the preferred range is from 7.0 to 9.0. The lower limit of the first range given, a pH of 6.0, is very close to the pH value necessary for polymerization. In the upper range, the monomer may be hydrolyzed or may react with water under the influence of base to form bis(beta-cyanoethyl) ether. For example, if 0.3 part of sodium hydroxide is employed in Example 2 above instead of 0.3 part of sodium borate, the pH of the resultant system is 11.4 and no polymerization occurs. However, under these conditions of pH and temperature, there is considerable hydrolysis of the monomer. Accordingly, it is desired to use pHs in the range from 7.0 to 9.0, thereby avoiding such troublesome reactions. It is possible to obtain varying degrees of control. For example, if 0.3 part of potassium acetate is employed in Example 2 in lieu of the sodium borate, the resultant pH is 6.0, and polymerization occurs resulting in a 5% yield of polymer. Generally, it is preferred to adjust the pH between 7.0 and 9.0 in order to obtain complete control.

This process may be advantageously used at the ordinary operating temperatures used for polymerization reactions, i. e., 30 to 50° C. It is also effective at lower temperatures but polymerization reactions carried out at temperatures above 70° C. cannot usually be stopped by this method since the higher temperature will cause the polymerization to continue despite the change in pH.

The method of this invention can be used to stop either the batch or the continuous polymerization processes. In the batch process, the entire amount of polymerization stopper necessary to change the pH can be added at one time. The polymerization will stop as soon as complete mixing has been achieved. In the continuous process the stopper in solution can be continuously added by means of a proportioning pump or like device to the polymerization slurry as it is being drawn off from the reactor vessel.

Among the materials that will effectively give the desired pH to stop the polymerization are sodium bicarbonate, sodium borate, sodium hydroxide, sodium and potassium cyanide, sodium and potassium meta-arsenite and potassium acetate. Of these, however, potassium acetate is almost too weak to stop the reaction completely, while sodium hydroxide is so strong that care must be exercised to avoid hydrolysis of the monomer. Of course, it is obvious that other moderately alkaline materials which give the same effective pHs will be useful in stopping the polymerization reaction. For example, potassium hydroxide, potassium borate, potassium bicarbonate, lithium bicarbonate, potassium dichromate and sodium aluminate may be used in the process of this invention.

The process of this invention is applicable to the polymerizations of acrylonitrile, either alone or with up to 15% of copolymerizable monomers, such as styrene, methyl vinyl ketone, butadiene, and other vinyl, acrylic and methacrylic and diolefin compounds. While the optimum pH for polymerization of vinyl compounds or their mixtures varies with the materials being polymerized, the pH optimums may be readily determined and usually fall within the pH range of 6.0 to 10.0. Furthermore, these polymerization stoppers are useful only with the activated-persulfate type catalyst, since pH does not seem to have a very important role when the persulfate catalyst is used alone. While the invention has been described in particular reference to polymerizations in which ammonium persulfate was the catalyst and sodium bisulfite the activator, the process of this invention may be applied to any persulfate activated acrylonitrile polymerization. Persulfates normally used in these polymerizations are sodium, potassium and ammonium persulfate. Activators which may be used include sodium bisulfite, sodium hyposulfite, sodium thiosulfite, hydroxylamine hydrochloride and silver nitrate.

The drawback of many of the stabilizers disclosed by the prior art is that while it may be possible to use them to stop further polymerization they are usually materials that hydrolyze or otherwise destroy the unreacted monomeric materials or catalysts and activators. Such a loss of monomer is not economically practical for commercial operations since the cost of a process usually depends to a certain extent on efficient recovery of unchanged materials. By the process of this invention, it is possible through control of pH to recover any unreacted monomer quantitatively. Furthermore, under the conditions disclosed herein, there is little or no hydrolysis or other reaction of the monomer with water during recovery operations.

In the batch polymerizations the average molecular weight of polymer formed is about 80,000 up to 50% yields. If polymerization is allowed to continue beyond 50% yield, the average molecular weight decreases, because the polymer formed in the later stages is of low molecular weight. Thus, at 80% yield the average molecular weight is usually only about 60,000. Accordingly, in polymerizations of acrylonitrile it is desirable to produce polymers characteristic of those obtained at 25% to 40% yields in order to get uniformity of product and high molecular weights. There is a range of acceptable molecular weights depending on the end properties desired. This range is from about 50,000 to about 120,000. If desired, the stoppers employed in this invention may be added at any stage of the polymerization. In this manner it is possible to produce a series of polymers each member of which has different average molecular weight and, hence, different properties from the next member. Normally, the process of this invention is operated so that polymers having molecular weights at least of about 50,000 are obtained.

By the process of this invention the polymerization reactions can be stopped when the desired yield has been reached, thereby preventing the formation of polymer having molecular weight differing widely from the average. In this manner a uniform reproducible polymeric material can be obtained. Such uniformity of product is not possible unless control measures are available to stop the polymerization when desired. In the field of synthetic textiles, it is especially important to have a polymer of uniform molecular weight due to the fact that any variation will cause a noticeable change in the physical and chemical properties of solutions of the polymers and of filaments and yarns prepared from such solutions.

Again by using this method, no special process is necessary to remove the polymerization stopper from the polymerizate. The polymer after precipitating from the reaction mixture is filtered to remove the excess liquid and unreacted monomer and then washed as part of the filtration operation. The washing operation dissolves and removes the polymerization stopper so that the polymer is completely free of any contamination. The monomer may be easily recovered by distillation of the residual of unreacted monomer, liquid media, catalyst, and polymerization stopper. If desired, the filtrate may be used in further polymerizations merely by adding acidic materials, such as an acid, to obtain a pH of less than 6.0. A pH range from about 2.0 to about 6.0 is generally satisfactory, while for most purposes a pH of about 3.0 leads to good results. Usually if the filtrate is recycled, additional monomer, catalyst and activator is added in desired proportions to obtain a system similar to that originally used. In such recycling it is not necessary to employ expensive distillation or extraction procedures.

Furthermore, by the use of the process of this invention, the polymerization of unchanged monomeric material present in the filtrate after the polymer has been removed is prevented; thus, polymerization of the monomer prior to recovery or prior to recycling does not occur.

Any departure from the procedure described herein which conforms to the principles of the invention is intended to be included within the scope of the claims below.

I claim:

1. In the polymerizations of acrylonitrile to polymers containing at least 85% acrylonitrile, a process for substantially stopping said polymerizations, which comprises adjusting the polymerization systems during polymerization to a pH from 6.0 to 10.0, the said systems containing a persulfate catalyst and a bisulfite activator and being heated to a temperature from 30° C. to 50° C.

2. In the polymerizations of acrylonitrile to polymers containing at least 85% acrylonitrile, a process for substantially stopping said polymerizations, which comprises adjusting the polymerization systems during polymerization to a pH from 6.0 to 10.0 by the addition of sodium bicarbonate, the said systems containing a persulfate catalyst and a bisulfite activator and being heated to a temperature from 30° C. to 50° C.

3. In the polymerizations of acrylonitrile to polymers containing at least 85% acrylonitrile, a process for substantially stopping said polymerizations, which comprises adjusting the polymerization systems during polymerization to a pH from 6.0 to 10.0 by the addition of sodium borate, the said systems containing a persulfate catalyst and a bisulfite activator and being heated to a temperature from 30° C. to 50° C.

4. In the polymerizations of acrylonitrile to polymers containing at least 85% acrylonitrile, a process for substantially stopping said polymerizations, which comprises adjusting the polymerization systems during polymerization to a pH from 6.0 to 10.0 by the addition of sodium hydroxide, the said systems containing a persulfate catalyst and a bisulfite activator and being heated to a temperature from 30° C. to 50° C.

5. In the activated persulfate catalyzed polymerizations of acrylonitrile to polymers containing at least 85% acrylonitrile, the step which comprises controlling the polymerizations by adjusting the pH of the polymerization systems during polymerization to a pH from 6.0 to 10.0, the said systems being heated to a temperature from 30° C. to 50° C.

6. In the polymerizations of acrylonitrile to polymers containing at least 85% acrylonitrile, a process for substantially stopping said polymerizations, which comprises adjusting the polymerization systems to a pH from 6.0 to 10.0, the said systems containing a persulfate catalyst and a bisulfite activator and being heated to a temperature from 30° C. to 50° C., and substantially terminating the polymerizations when about 25% to about 40% yields of the said polymers have been obtained.

7. In the polymerizations of acrylonitrile to polymers containing at least 85% acrylonitrile, a process for substantially stopping said polymerizations, which comprises adjusting the polymerization systems to a pH from 6.0 to 10.0, the said systems containing ammonium persulfate and sodium bisulfite and being heated to a temperature from 30° C. to 50° C., and substantially terminating the polymerizations when about 25% to about 40% yields of polyacrylonitrile have been obtained.

JOHN CADWALLADER RICHARDS.

REFERENCES CITED

The following references are of record in the file of this patent:

UNITED STATES PATENTS

| Number | Name | Date |
|---|---|---|
| 2,383,055 | Fryling | Aug. 21, 1945 |
| 2,419,090 | Rainard | Apr. 15, 1947 |
| 2,436,926 | Jacobson | Mar. 2, 1948 |

FOREIGN PATENTS

| Number | Country | Date |
|---|---|---|
| 573,270 | Great Britain | Nov. 14, 1945 |

OTHER REFERENCES

Bacon, "Reduction Activation. A New Polymerization Technique," Transaction Faraday Society XLII, March-April 1946, pages 140–155.